US012794550B2

(12) United States Patent
Maluf et al.

(10) Patent No.: US 12,794,550 B2
(45) Date of Patent: Nov. 10, 2026

(54) WIRELESS DIGITAL NETWORK USING NEAR VERTICAL INCIDENCE SKYWAVE

(71) Applicant: Cisco Technology, Inc., San Jose, CA (US)

(72) Inventors: David A. Maluf, Mountain View, CA (US); Pradeep K. Kathail, Los Altos, CA (US); Ashok Krishnaji Moghe, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 359 days.

(21) Appl. No.: 18/242,849

(22) Filed: Sep. 6, 2023

(65) Prior Publication Data

US 2025/0080216 A1 Mar. 6, 2025

(51) Int. Cl.

| | |
|---|---|
| ***H04B 7/22*** | (2006.01) |
| ***H04L 5/00*** | (2006.01) |
| ***H04W 72/0453*** | (2023.01) |

(52) U.S. Cl.

CPC ............. *H04B 7/22* (2013.01); *H04L 5/0048* (2013.01); *H04W 72/0453* (2013.01)

(58) Field of Classification Search

None

See application file for complete search history.

(56) References Cited

U.S. PATENT DOCUMENTS

| | | | | |
|---|---|---|---|---|
| 10,135,499 | B2 | 11/2018 | Stratigos, Jr. | |
| 10,205,513 | B1 * | 2/2019 | Winters | H04W 24/02 |
| 11,190,247 | B2 | 11/2021 | Forenza et al. | |
| 11,658,711 | B2 | 5/2023 | Gao et al. | |
| 11,689,909 | B2 | 6/2023 | Di Dio | |
| 2005/0273330 | A1 * | 12/2005 | Johnson | G10L 19/0018 455/563 |
| 2014/0153674 | A1 * | 6/2014 | Stratigos, Jr. | H04B 1/0003 375/340 |
| 2014/0269304 | A1 * | 9/2014 | Rajkotia | H04L 45/30 370/235 |
| 2018/0110030 | A1 * | 4/2018 | Stevenson | H04W 72/02 |
| 2020/0128377 | A1 * | 4/2020 | Dio | H04W 72/02 |
| 2022/0108207 | A1 * | 4/2022 | Graf | G06N 20/00 |
| 2023/0066904 | A1 | 3/2023 | Babich | |
| 2023/0124037 | A1 * | 4/2023 | Rittman | H04B 7/15528 455/7 |

OTHER PUBLICATIONS

B. Witvlet, Near Vertical Incidence Skywave, The propagation mechanism, the impact of antenna, backscatter and solar flares, pp. 1-10, Aug. 16, 2022.*

(Continued)

*Primary Examiner* — Christopher M Crutchfield

(74) *Attorney, Agent, or Firm* — Lee & Hayes, P.C.

(57) ABSTRACT

In one embodiment, a gateway device communicates on a first digital computer network. The gateway device also communicates on a near vertical incident skywave area network using digital data encapsulated in analog ionospheric refracted signals. The gateway device further modulates signals between the first digital computer network and the near vertical incident skywave area network based on dynamic channel selection and multi-domain multiplexing.

20 Claims, 9 Drawing Sheets

(56) References Cited

OTHER PUBLICATIONS

Sutoyo, Dedi Irawan, Muhammad Rizki, Muhammad Luthfi Hamzah, Data Analysis of Near Vertical Incidence Skywave (NVIS) Propagation in Pekanbaru International Conference on Education Technology (Year: 2021).*

Yan, Zue, Junbo, Peng, Transmitter Elevation Angle Prediction of Near Vertical Incidence Skywave Communication Link, pp. 106, (Year: 2021).*

"NVIS Communications—Premium Communications Solutions", online: https://nviscommunications.com/, accessed Aug. 11, 2023, 7 pages.

"Codan Communications Announces NVIS Communications as Primary Partner for the United States, Mexico and Caribbean" online, https://codancomms.com/impact/news/codan-communications-announces-nvis-communications-as-primary-partner-for-the-united-states-mexico-and-caribbean, accessed Aug. 11, 2023, 4 pages.

"The Sentry Mesh 6161 Is the Ultimate Personal Radio That Delivers Performance, Range and Versatility in a Lightweight and Compact, Wearable Unit That Minimises User Burden", online: https://codancomms.com/products/sentry_mesh_6161, accessed Aug. 11, 2023, 10 pages.

"Near Vertical Incident Skywave (NVIS) Antennas", online: https://practicalantennas.com/applications/nvis/, accessed Aug. 11, 2023, 10 pages.

Witvliet, et al., "Near vertical incidence skywave propagation: Elevation angles and optimum antenna height for horizontal dipole antennas", IEEE Antennas and Propagation Magazine, vol. 57, No. 1, Feb. 2015, 18 pages, IEEE.

* cited by examiner

700

| DISTANCE KM (MILES) | 40M VERTICAL ANGLE DEGREES | 60M VERTICAL ANGLE DEGREES | 80M VERTICAL ANGLE DEGREES | 160M VERTICAL ANGLE DEGREES |
|---|---|---|---|---|
| 50 KM (30 MI) | 84 | 84 | 83 | 75 |
| 100 KM (60 MI) | 78 | 76 | 75 | 61 |
| 150 KM (95 MI) | 74 | 70 | 66 | 52 |
| 200 KM (125 MI) | 65 - 72 | 58 - 65 | 47 - 62 | 43 |
| 250 KM (160 MI) | 57 - 68 | 52 - 61 | 41 - 58 | 37 |
| 300 KM (190 MI) | 52 - 64 | 47 - 53 | 33 - 53 | 32 |
| 350 KM (220 MI) | 45 - 60 | 46 | 29 - 47 | 28 |
| 400 KM (250 MI) | 40 - 53 | 28 - 45 | 27 | 23 |

FIG. 7A

WIRELESS DIGITAL NETWORK USING NEAR VERTICAL INCIDENCE SKYWAVE

TECHNICAL FIELD

The present disclosure relates generally to computer networks, and, more particularly, to a wireless digital network using near vertical incidence skywave.

BACKGROUND

Long range, low power wireless networks have become a valuable asset for the operation of Internet of Things (IoT) devices, and particularly to IoT devices that operate over long distances (e.g., distances of 1-500 miles). Such devices and networks can enable smart IoT applications that solve long distance challenges in wireless communication and can be useful in energy management, natural resource reduction, pollution control, infrastructure efficiency, and disaster prevention. IoT devices that operate over long distances have hundreds of known uses cases including smart cities, smart homes and buildings, smart communities, metering, supply chain and logistics, agriculture, and more.

However, various wireless communication technologies have limitations based on the frequency of the electromagnetic radiation used for communication. For example, long-range wide area networks, such as LoRaWAN® generally operate in the United States in the ultra high frequency (UHF) band (~900 MHZ) and can achieve a range of around one mile with a line-of-sight deployment. However, due to the line-of-sight requirements of such communication technologies, many IoT device use cases cannot be addressed when obstacles are present. For example, LoRaWAN® deployments generally do not fare well in mountainous areas or other geographical locations that do not offer a relatively clear line-of-sight between devices.

"Generation" telecommunications networks, such as 3G, 4G, 5G, etc. telecommunication networks can provide communication at larger distances (e.g., ~45 miles) than LoRaWAN® deployments provided a base station, such as a cellular tower, is within range of the devices that are attempting to communicate with one another. However, there are locations at which base stations cannot be placed, thereby limiting the general applicability of "generation" telecommunication networks in at least some of the use cases mentioned above.

Satellite communications and more recently, low earth orbit (LEO) satellite based networks, are possible solutions to provide reasonable communication to IoT devices that operate over long distances. However, power consumption and cost at large scale (e.g., for a mining equipment fleet or other large-scale deployment) may make such technologies less than desirable. For example, a Starlink® dish can be quite costly per year per end node, while satellite-based solutions are generally not ruggedized and may face challenges in mobility.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
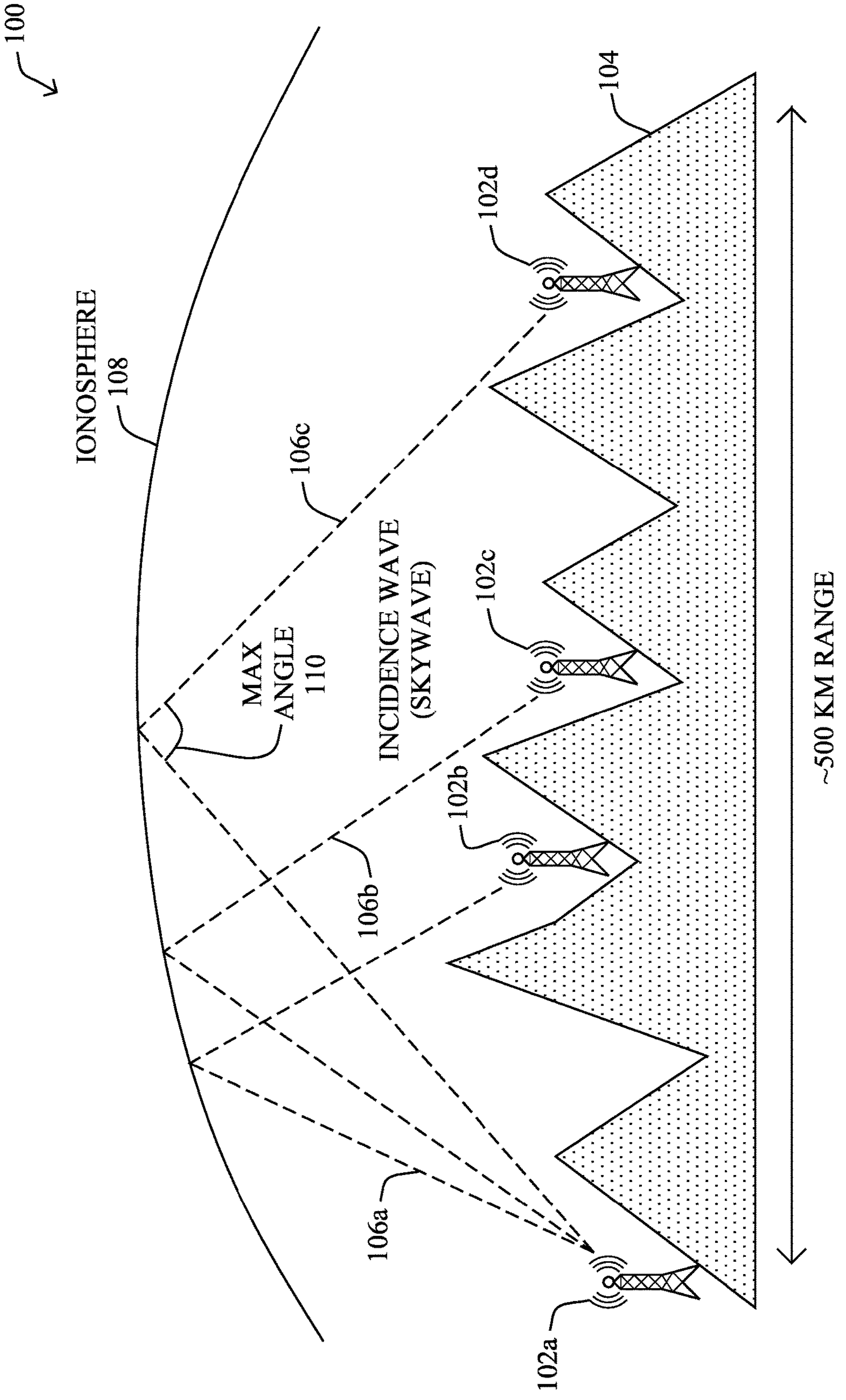
FIG. 1 is a diagram of an example near vertical incidence skywave network.

According to one or more embodiments of the disclosure, a gateway device communicates on a first digital computer network. The gateway device also communicates on a near vertical incident skywave area network using digital data encapsulated in analog ionospheric refracted signals. The gateway device further modulates signals between the first digital computer network and the near vertical incident skywave area network based on dynamic channel selection and multi-domain multiplexing.

Description

A computer network is a geographically distributed collection of nodes interconnected by communication links and segments for transporting data between end nodes, such as personal computers and workstations, or other devices, such as sensors, IoT devices, audio communication devices (voice-over-IP (VOIP)), etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications)

temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a diagram of an example near vertical incidence skywave (NVIS) network 100 illustratively comprising antennae, such as a plurality of base stations/access points communicating using electromagnetic waves (e.g., incidence waves or "skywaves"), as shown. In the example of FIG. 1, the antennae 102*a*, 102*b*, 102*c*, 102*d*, etc. (referred to herein collectively as "antennae 102") are deployed at various physical locations throughout a mountain range 104. In order to communicate with one another, the antennae 102 utilize incidence waves 106*a*, 106*b*, 106*c*, etc. (referred to herein collectively as "incidence waves 106"), which are reflected off of the Earth's ionosphere 108. Although shown in FIG. 1 as a single layer of the Earth's ionosphere 108 so as to not obfuscate the drawing layout, it will be appreciated that the Earth's ionosphere 108 contains multiple layers (e.g., the F-layer, the E-layer, and the D-layer). Note that while mountain range 104 illustrates a particular example of the usefulness of NVIS networks, large distances in general, particularly based on the curvature of the earth, can also benefit from the use of such long-range ionospheric incidence communication technology.

NVIS networks 100 face a number of communication challenges. For example, usable frequencies in NVIS networks 100 are generally dictated by local ionospheric conditions, which have a strong dependence on geographical location. In addition, usable frequencies for communications in NVIS networks 100 may also be dependent on the time of day or night (i.e., because sunlight causes the lowest layer of the ionosphere, called the D layer, to increase, causing attenuation of low frequencies during the day while the maximum usable frequency (MUF) which is the critical frequency of the F layer rises with greater sunlight), the distance from the equator (or poles) where the NVIS network 100 is deployed (i.e., optimum NVIS frequencies tend to be higher towards the tropics and lower towards the arctic regions), the season, and/or sunspot cycles among other conditions.

As will be appreciated, the angle at which each incidence wave 106 is reflected off the Earth's ionosphere 108 dictates a distance the incidence waves 106 will travel from a first antenna 102*a* to a second antenna 102*b*, the first antenna 102*a* to a third antenna 102*c*, and/or from the first antenna 102*a* to a fourth antenna 102*d*. For example, the incidence wave 106*a* is transmitted from the first antenna 102*a* a first distance over the mountain range 104 to the second antenna 102*b*. Similarly, the incidence wave 106*b* is transmitted from the first antenna 102*a* a second distance over the mountain range 104 to the third antenna 102*c*, and the incidence wave 106*c* is transmitted from the first antenna 102*a* a third distance over the mountain range 104 to the fourth antenna 102*d*. It is noted that, in the example of FIG. 1, the incidence wave 106*c* is transmitted from the first antenna 102*a* a third distance over the mountain range 104 to the fourth antenna 102*d* at a max angle 110, which is the largest angle of reflection that an incidence wave 106 may be reflected off of the Earth's ionosphere 108 and still successfully be received by one of the antennae 102 (the antenna 102*d* in the example of FIG. 1).

In addition, to the angle of incidence (e.g., an angle at which the antennae 102 is pointed) with respect to the Earth's ionosphere 108 altering the distance that an incidence wave 106 travels, the frequency band at which the incidence wave(s) 106 are generated may also impact the distance that an incidence waves 106 travel. Further, the incidence waves 106 may be reflected by different layers of the Earth's ionosphere 108, which may also impact the distance that an incidence waves 106 travel. For example, an angle of incidence may be larger (e.g., 50°) when reflected off the F layer (roughly a nominal height of one hundred sixty miles above sea level) of Earth's ionosphere 108 to travel approximately two hundred-seventy miles than an angle of incidence (e.g., 28°) when reflected off the E layer (roughly a nominal height of one hundred ten miles above sea level) of Earth's ionosphere 108 to travel approximately two hundred-seventy miles.

Although shown as antennae 102 in FIG. 1, embodiments are not so limited and other devices are contemplated within the scope of the disclosure that could replace one or more of the antennae 102 illustrated in FIG. 1. For example, one or more of the antennae 102 that are illustrated as receiving the incidence waves 106 in FIG. 1 could be IoT devices, radios, audio communication devices (e.g., VOIP), or other network endpoint devices. That is, in a non-limiting example, the antenna 102*d* could, in the alternative, be an IoT device that is configured to receive the incidence wave 106*c* from the antenna 102*a*, etc. In addition to, or in the alternative, the antennae 102 can be configured to communicate with endpoint devices (e.g., IoT devices, audio communication devices, etc.) that are geographically proximate to each of the antennae 102.

According, in various embodiments, the NVIS network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as outdoor IoT nodes such as temperature sensors, soil sensors, humidity sensors, humidity sensors, etc., as well as indoor IoT nodes such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture.

In contrast to traditional networks, LLNs face a number of communication challenges, particularly when operated in a NVIS network 100. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QOS), security, network management, and traffic engineering extremely challenging, to mention a few.

Figure 2:
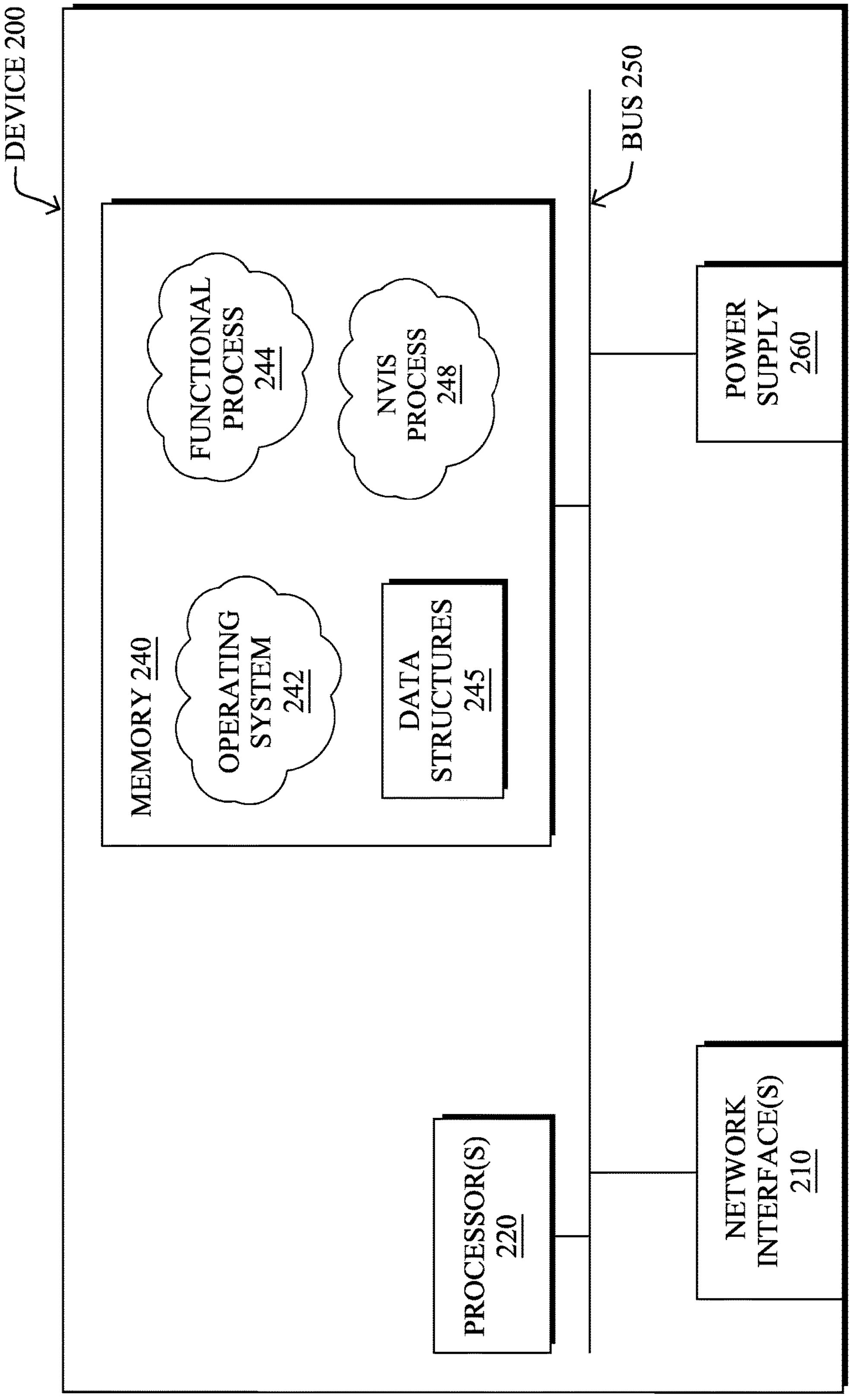
FIG. 2 illustrates an example network device/node.

FIG. 2 is a schematic block diagram of an example node/device 200 that may be used with one or more embodiments described herein, e.g., as any of the computing devices described herein, particularly an IoT device, audio communication device, router, server (e.g., a network controller located in a data center, etc.), any other computing device that supports the operations of NVIS network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the NVIS network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 244, and illustratively, a near vertical incidence skywave (NVIS) process 248, as described herein, any of which may alternatively be located within individual network interfaces. Notably, functional processes 244, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, an IoT device would be configured to operate as an IoT device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

NVIS process 248 includes computer executable instructions that, when executed by processor(s) 220, cause device 200 to provide a NVIS digital gateway, as described in more detail, herein. For example, the NVIS process 248 includes computer executable instructions that, when executed by processor(s) 220, cause device 200 to provide NVIS signal modulation, perform handshake processes, define and utilize a medium access layer as an NVIS communication layer, perform encryption and/or decryption on NVIS communications, encapsulate digital data in an analog signal, and/or perform data compression and/or decompression operations, among other functions described in more detail herein.

As noted above, current approaches that utilize NVIS networks rely on the propagation of analog signals between antennae and/or devices in communication with the antennae. This generally means that current NVIS networks are unable to be configured as a wide area network (WAN). Further, alternative approaches to providing wireless communications in topologically complex geographic regions (e.g., mountain ranges, etc.) can suffer from issues in scalability and/or may be prohibitively costly for some applications, among other shortcomings.

Wireless Digital Network Using Near Vertical Incidence Skywave

The techniques herein allow for a wireless digital network using a near vertical incidence skywave (NVIS) gateway. Although NVIS has been in use for many decades in amateur radio (e.g., HAM radio), these deployments relied on analog signal transmission. In contrast, embodiments of the present disclosure introduce the use of NVIS as a digital network, along with the necessary mechanisms to ensure proper operation of such a wireless digital NVIS network, resulting in a true NVIS wide area network (WAN).

As described in more detail herein, the NVIS WAN of the present disclosure provides:

- NVIS signal modulation that is capable of multiplexing in any combination of space-division, time-division, frequency-division, wavelength-division, orthogonal frequency division multiplexing, and/or code-division, or any other multiplexing method(s);
- The use of a standard handshake in combination with channel selection and channel scheduling use;

- The definition and use of a medium access layer as an NVIS communication layer;
- The use of advanced, efficient, dynamic encryption in conjunction with compression techniques;
- The use of qualitative/quantitative compression method to optimize bandwidth usage and/or capacity, as well as other compression methods when applicable;
- A plurality of application digital interfaces including serial frame-based data streams and Ethernet-based data; and
- A plurality of additional digital data encapsulated in an analog signal that is decoded at the application layer.

In addition, it is noted that successful NVIS operation may require being able to change frequency to suit current conditions and factors such as geolocation, time of day, date indicating seasonal atmospheric conditions etc., as well as optimum antenna angles. However, approaches that are currently available for frequency selection use manual computations performed on standalone platforms. Further, current approaches may not track changing weather and geolocation conditions.

In order to address these and other deficiencies, embodiments of the present disclosure provide enhancements to the digital NVIS communication and/or IoT gateway by providing computational and geolocation detection capabilities and by providing a platform to run one or more of algorithms associated therewith. In addition, embodiments described herein can use results of such algorithms to automatically select the best band for operation and/or can keep running the algorithms in background to proactively update the operation as the underlying conditions change.

Further, embodiments of the present disclosure may leverage the computational and geolocation detection capabilities of the digital NVIS communication and/or IoT gateways to provide autonomous and rapidly converging link establishment. This may allow for establishment of the digital NVIS communication and/or IoT gateways discussed herein to aid first responder, disaster management, and/or IoT sensor gateway applications, among other use cases.

Specifically, according to one or more embodiments of the disclosure as described in detail below, a gateway device communicates on a first digital computer network. The gateway device also communicates on a near vertical incident skywave area network using digital data encapsulated in analog ionospheric refracted signals. The gateway device further modulates signals between the first digital computer network and the near vertical incident skywave area network based on dynamic channel selection and multi-domain multiplexing.

Illustratively, the techniques described herein may be performed by hardware, software, and/or firmware, such as in accordance with the NVIS process 248, which may include computer executable instructions executed by the processor 220 (or independent processor of interfaces 210) to perform functions relating to the techniques described herein, e.g., in conjunction with functional process 244 and/or other processes on other devices (e.g., communications with receivers, direction from controllers, etc.).

Figure 3:
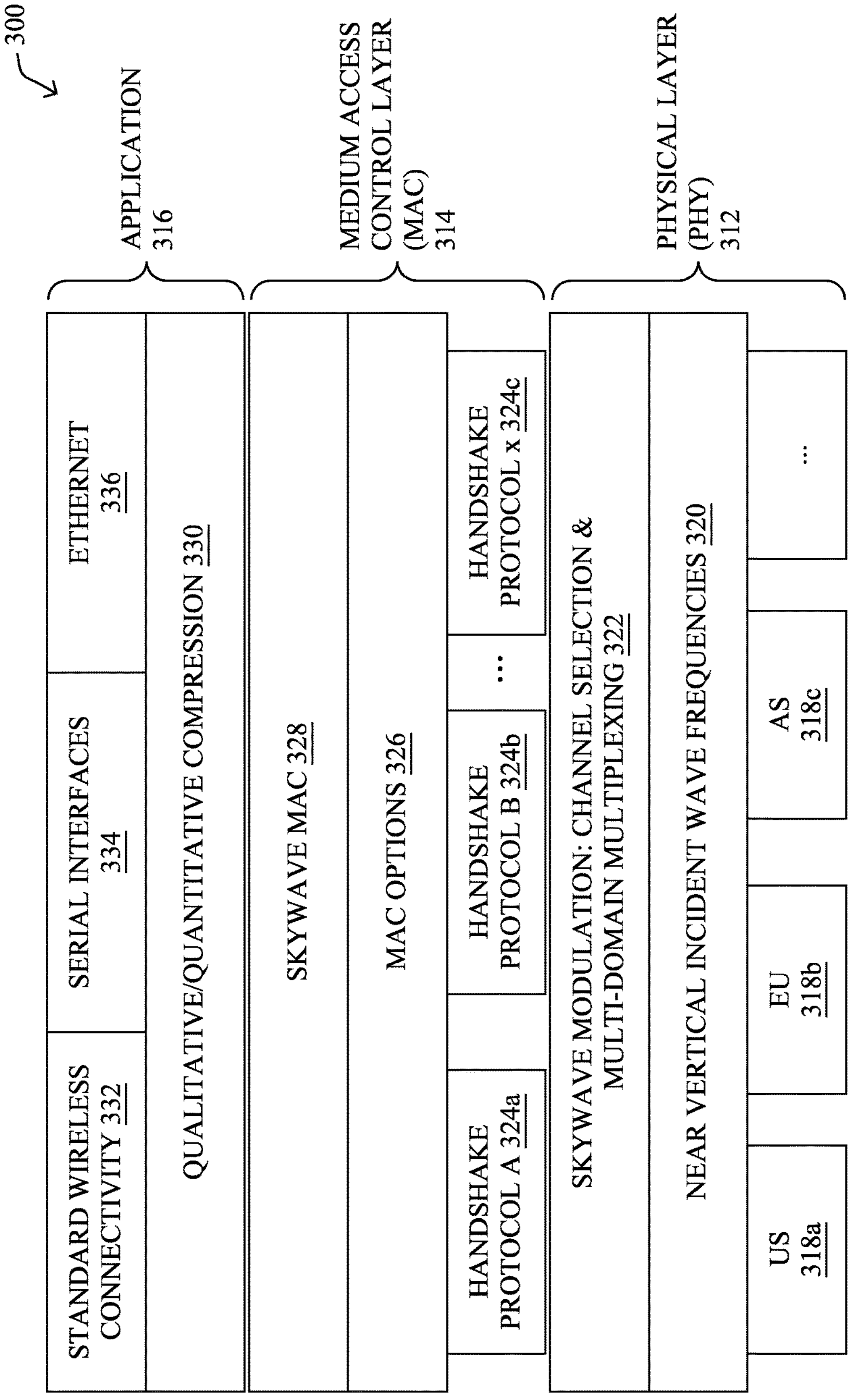
FIG. 3 illustrates an example architecture for a near vertical incidence skywave network.

Operationally, FIG. 3 illustrates an example architecture 300 for a near vertical incidence skywave (NVIS) digital network (e.g., the NVIS network 100 of FIG. 1). As shown in FIG. 3, the example architecture 300 shows the basic layers of the NVIS digital network in accordance with the present disclosure. For example, the architecture 300 illustrative includes (at least) a physical (PHY) layer 312, a medium access control (MAC) layer 314, and an application layer 316.

The PHY layer 312 defines the physical characteristics of the NVIS digital network and includes techniques for modulation, wave frequency selection, multi-carrier access, beacons, channel selection and allocation, etc. As shown in FIG. 3, the PHY layer 312 can include selectable geographical information that can be used by the NVIS digital network when the NVIS network is deployed in different geographical regions. For example, the PHY layer 312 can include multiple geographical regions that are selectable based on whether the geographical region in which the NVIS digital network is deployed in is in the United States 318*a*, the European Union 318*b*, Asia 318*c*, etc.

As shown in FIG. 3, the PHY layer 312 further includes wave frequency information. More specifically, the PHY layer 312 includes near vertical incident wave frequencies 320. As will be appreciated, the most reliable frequencies for NVIS communications are between 1.8 MHz and 8 MHz. Above 8 MHz, the probability of success begins to decrease, dropping to near zero at 30 MHz. Usable frequencies are dictated by local ionospheric conditions, which have a strong systematic dependence on geographical location. Common bands used in amateur radio at mid-latitudes are 3.5 MHz at night and 7 MHz during daylight, with experimental use of 5 MHz frequencies. During winter nights at the bottom of the sunspot cycle, the 1.8 MHz band may be required. Military NVIS communications mostly take place on 2.4 MHz at night, and 5.7 MHz during daylight. This information is included in the near vertical incident wave frequencies 320 of the PHY layer 312.

The PHY layer 312 further includes skywave modulation 322, which, in some embodiments, comprises channel selection and multi-domain multiplexing information. As discussed herein, the NVIS network may follow LoRaWAN and/or WIFI in signal modulation, such as multiplexing in the wireless communication layer, except the two main differences are the frequency use and the use of the incident skywave methods. In other words, in contrast to signal modulation performed in LoRaWAN and WIFI paradigms, the NIVS network does not have direct line-of-sight between antennae and/or devices and instead relies on a reflected ionospheric signal.

The MAC layer 314 of the architecture 300 controls the hardware responsible for interaction with a wired, optical, or wireless transmission medium associated with connectivity of the NVIS network. As shown in FIG. 3, the MAC layer 314 includes multiple handshake protocols, such as the Handshake Protocol A 324*a*, the Handshake Protocol B 324*b*, and the Handshake Protocol X 324*c*. These handshake protocols can be used by the NVIS network to establish one or more communication channels.

The MAC layer 314 further includes MAC options 326 and skywave MAC 328 information. In some embodiments, the MAC options 326 and/or the skywave MAC 328 govern data transmission policies in the NVIS network. This allows for multiple devices to be communicatively coupled to the NVIS network with minimum (or no) packet collisions.

As shown in FIG. 3, the architecture 300 further includes an application layer 316, which is an abstraction layer that specifies the shared communications protocols and interface methods used by hosts and/or devices in the NVIS network. The application layer 316 provides qualitative and/or quantitative compression, as described in more detail herein.

In addition, the application layer 316 includes standard wireless connectivity 332 capabilities, which can include standard short range radio communication interfaces (e.g., AM/FM, Bluetooth, and/or WIFI, etc.), serial interface(s) 334 such as Supervisory Control and Data Acquisition (SCADA) interface(s), MODBUS interface(s), and/or CANBUS interfaces, etc. In addition, the application layer 316 can include an Ethernet interface 336, among others depending upon the desired implementation, accordingly.

Figure 4A:
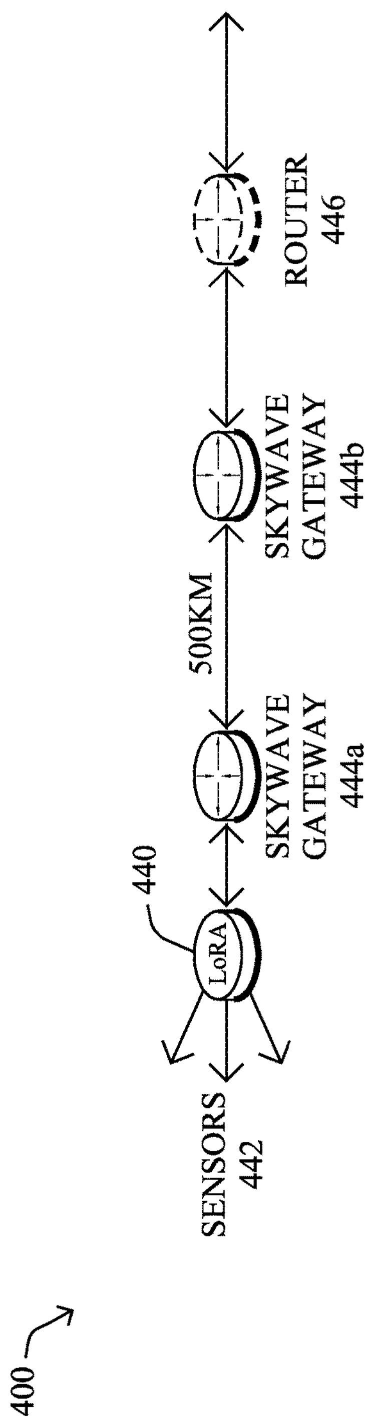
FIG. 4 (FIGS. 4A-4B) illustrates an example architecture for a skywave gateway.
Figure 4B:
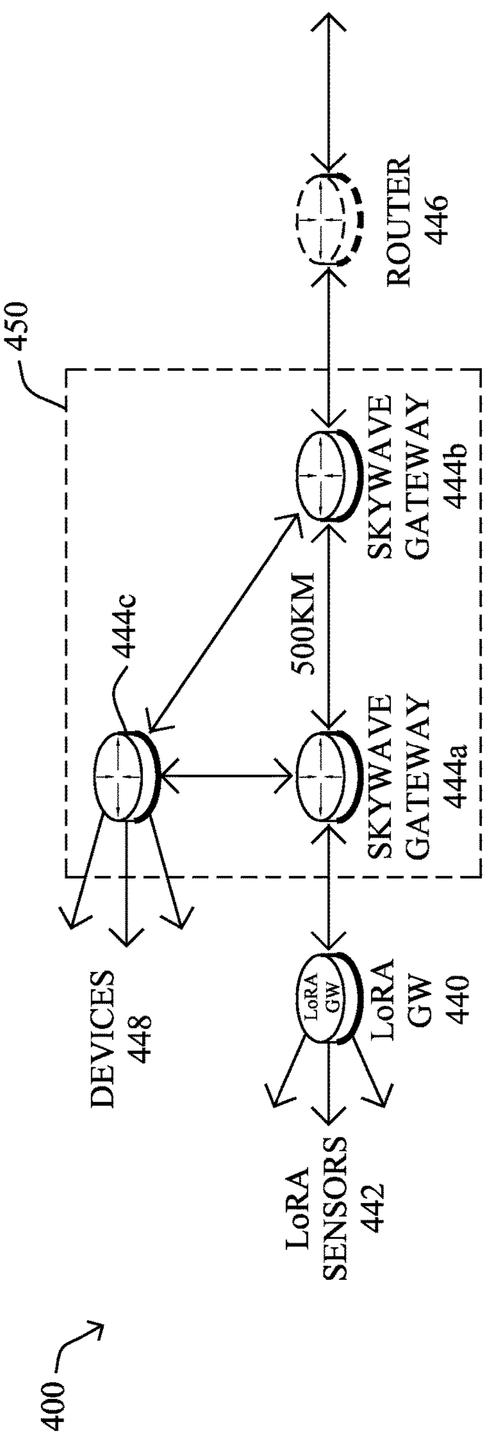

FIGS. 4A-4B illustrate an example architecture 400 for a skywave gateway. In the example of FIG. 4A, the example skywave gateway has two nodes, while the example of FIG. 4B illustrates an example skywave gateway is deployed in a WAN architecture. The skywave gateways of FIGS. 4A-4B may include any sub-selection, or all of, the features discussed above in connection with FIG. 3.

As shown in FIG. 4A, the architecture 400 includes a long-range (LoRa) component 440 that is communicatively coupled to existing devices, such as a military radio ethernet base radio or LoRA gateway connected sensors 442, such as IoT device(s). As will be appreciated, the LoRa component 440 can provide radio frequency (RF) modulation for low-power wide area networks (LPWANs). In some embodiments, the LoRa component 440 can be a LoRa gateway or other device configured to provide LoRa RF modulation.

The LoRa component 440 can be communicatively coupled to a first skywave gateway **444*a* deployed at a first geographical location. The first skywave gateway 444*a* can be communicatively coupled to a second skywave gateway 444*b* that is deployed in a second geographical location. In some embodiments, the first skywave gateway 444*a* and/or the second skywave gateway 444*b* include the architecture 300 illustrated in FIG. 3. Further, in some embodiments, topographical variations (e.g., the mountain range 104 of FIG. 1) can be present between the first skywave gateway 444*a* and the second skywave gateway 444*b*. In the non-limiting example illustrated in FIG. 4A the first skywave gateway 444*a* and the second skywave gateway 444*b*** are separated by a distance of around 500 kilometers; however, it will be appreciated that embodiments are not so limited.

As discussed above, the first skywave gateway **444*a* and the second skywave gateway 444*b* may communicate with one another by transmitting and receiving RF waves (e.g., the incidence waves 106 of FIG. 1). In such embodiments, the RF waves are reflected off the Earth's ionosphere 108, as shown in FIG. 1. That is, in some embodiments, the communication between the first skywave gateway 444*a* and the second skywave gateway 444*b*** is based on NVIS principles.

As shown in FIG. 4A, the second skywave gateway **444*b* is communicatively coupled to a router 446. For example, the second skywave gateway 444*b*** can be coupled to a WIFI router and can connect to a peer network device or simply to the internet.

As shown in FIG. 4B, the architecture 400 includes a LoRa component 440 (e.g., a LoRa gateway) that is communicatively coupled to existing devices, such as a military radio ethernet base radio or LoRA gateway connected sensors 442, such as IoT device(s). Similar to the example of FIG. 4A, in FIG. 4B, the LoRa component 440 can be communicatively coupled to a first skywave gateway **444*a* deployed at a first geographical location. The first skywave gateway 444*a* can be communicatively coupled to a second skywave gateway 444*b* that is deployed in a second geographical location. In the non-limiting example illustrated in FIG. 4B the first skywave gateway 444*a* and the second skywave gateway 444*b* are separated by a distance of around 500 kilometers; however, it will be appreciated that embodiments are not so limited. In the embodiments of FIG. 4B, the second skywave gateway 444*b* is communicatively coupled to a router 446, similar to what is shown in FIG. 4A**.

The main difference between the embodiment of FIG. 4A and the embodiment of FIG. 4B is that the embodiments illustrated in FIG. 4B include at least three skywave gateways: a first skywave gateway **444*a*, a second skywave gateway 444*b*, and a third skywave gateway 444*c*, as opposed to the two skywave gateways shown in FIG. 4A. Although three skywave gateways 444 are illustrated in FIG. 4B, embodiments herein are not so limited and architectures 400 including greater than three skywave gateways 444** are contemplated within the scope of the disclosure.

When three or more skywave gateways 444 are present, as shown in the architecture 400 of FIG. 4B, a skywave WAN 450 architecture is provided, which may be referred to herein in the alternative as a "NVIS WAN." As noted above, in some embodiments, the skywave WAN 450 is a digital wireless network with multiple nodes formed by the three or more skywave gateways 444.

As mentioned above, the skywave WAN 450 may rely on communication frequencies between 1.8 MHz and 8 MHz (i.e., the most reliable NVIS frequencies) and may support common bands used in amateur radio at mid-latitudes, which are 3.5 MHz at night and 7 MHz during daylight, military NVIS communications mostly which take place on 2-4 MHz at night, and 5-7 MHz during daylight, as well as other frequency ranges for other applications, such a mining deployments, etc.

The skywave gateways 444 can have different implementations associated therewith based on the projected deployment type. For example, a first implementation may be associated with a skywave gateway 444 that is dedicated for military use and deployment. A different implementation may be associated with a skywave gateway 444 that is dedicated for non-military use in the US, which can consist of the emergency type agencies. A third deployment may be for non-US region for mining as in north Canada territories and Australia. Embodiments are not so limited, however, and other implementations can be associated to the skywave gateways 444 for different applications, regions, and/or deployments. Further, some implementations can be associated with different provided encryption algorithms. For example, a skywave gateway 444 that is dedicated for military use and deployment may also be associated with providing AES-256 encryption to communications generated therefrom, or other suitable encryption algorithms depending on the application, region, and/or deployment for the skywave gateway 444.

As mentioned above, the frequency of communications amongst the skywave gateways 444 may change based on various factors, such as the movement of the sun (e.g., the position of the sun with respect to the Earth), a particular location (e.g., a longitude and latitude coordinate corresponding to where the skywave gateway(s) 444 are deployed), and/or weather condition at location where the skywave gateways 444 are deployed, among other factors.

In order to address complications that may arise from these factors in previous approaches, the skywave gateways 444 (and hence the NVIS network 100 and/or the skywave WAN 450) are, in various embodiments, configured to determine an appropriate frequency for communication between the skywave gateways 444. For example, the skywave gateways 444 can model, learn (e.g., through machine learning techniques, etc.), and/or execute instructions stored internally by the skywave gateways 444 to select frequencies for use in communication between the skywave gateways 444.

That is, in contrast to utilizing previous techniques to determine an appropriate frequency for communication, such as using physical charts that require user input, using dedicated computing devices that generally require a user to input multiple variables to compute an appropriate frequency, and/or using internet based solutions that take user inputs to determine the appropriate frequency for communication, embodiments of the present disclosure provide "on board" global positioning satellite (GPS) information in addition to frequency selection capabilities that can automatically determine the appropriate frequency for communication between the skywave gateways 444 autonomously (i.e., in the absence of user input).

In some embodiments, the "on board" GPS information and frequency selection capabilities are provided by machine readable instructions that are executed by hardware associated with one or more of the skywave gateways 444 and can utilize location information, time information, date information, and other such information to automatically determine the appropriate frequency for communication between the skywave gateways 444 in the absence of user input. These capabilities can be especially beneficial in skywave WAN 450 deployments that are in remote and/or difficult to reach geographical locales.

In addition to the foregoing, embodiments herein can minimize power consumption burden on the skywave gateways 444. For example, some current "off the shelf" devices 448 and/or sensors 442 may require 20 Watts to operate at a distance of around 600 kilometers, while 150 Watt devices that exist may operate at distances of up to 1,500 kilometers. However, in accordance with the disclosure, such devices 448 and/or sensors 442 may be operated down to 5 Watts with or without amplification depending on the distance between one or more of the skywave gateways 444 that are in communication with the devices 448 and/or sensors 442.

As mentioned above, the skywave WAN 450 utilizes NVIS, which is a communications system based on vertically propagating radio waves that are reflected by Earth's ionosphere 108. NVIS techniques permit coverage up to 650 km (400 miles) or so using relatively low power equipment. To do so, the operating RF signal must be below a certain frequency called the "critical frequency." The critical frequency generally refers to the highest frequency value at which signals radiated straight up will still be returned to Earth by the ionosphere 108. Above that frequency, signals pass off into space.

One of the challenges with NVIS communication is that the critical frequency varies based on several factors:

- Latitudes: The critical frequency may vary based on latitude and may get as high as 12 MHz in the tropics or 9 MHz at higher latitudes, depending on the current ionospheric conditions;
- Time of the day: As the ionization layer changes throughout the day the critical frequency can vary from as low as 2 MHZ (at night) to as high as 30 MHz (during the day); however, NVIS communication may be limited to the 2 MHz to 12 MHz band;
- Time of the year: Just like the variation experienced throughout the day, the conditions of the ionosphere 108 vary considerably depending on the seasons. These effects may be more pronounced at higher latitudes such as in the Northern Americas as compared to the tropics; and
- The 11-year sunspot cycle: Since the sunspot cycle significantly affects the Earth's ionosphere 108, the sunspot cycle may also have a dominant effect on the critical frequency.

While the discussion above emphasizes the role of the critical frequency (i.e., the highest operable frequency for NVIS communication), at the other end of the spectrum, the minimum frequency is generally determined by RF absorption in the D layer of the ionosphere 108, which increases with ionization.

As a result, NVIS operation is bound in a band between the low frequency dictated by the RF energy absorption in the D layer and the high frequency (i.e., the critical frequency) dictated by several factors affecting the state of the ionosphere. Accordingly, successful NVIS operation may require the ability to change the transmission frequency to suit current conditions. Currently there are several algorithms used to calculate the best possible frequency band.

One such algorithm utilizes predictions based on the parameters such as location, time and date of operation, etc. Some other techniques utilize scanning by sending and listening to transmissions to detect signal activity. Yet other techniques include ionospheric measurement using the ionosonde. The ionosonde is essentially a high frequency radar which sends short pulses of radio energy into the ionosphere. If the radio frequency is not too high, the pulses are reflected to earth.

It is noted that these methods are currently implemented manually. For example, the aforementioned techniques to calculate the best possible frequency band are run manually on various platforms, such as online servers or other instruments. In general, the obtained results are then used by radio operators to manually select the proper band settings on their radio sets for NVIS communication.

Figure 5:
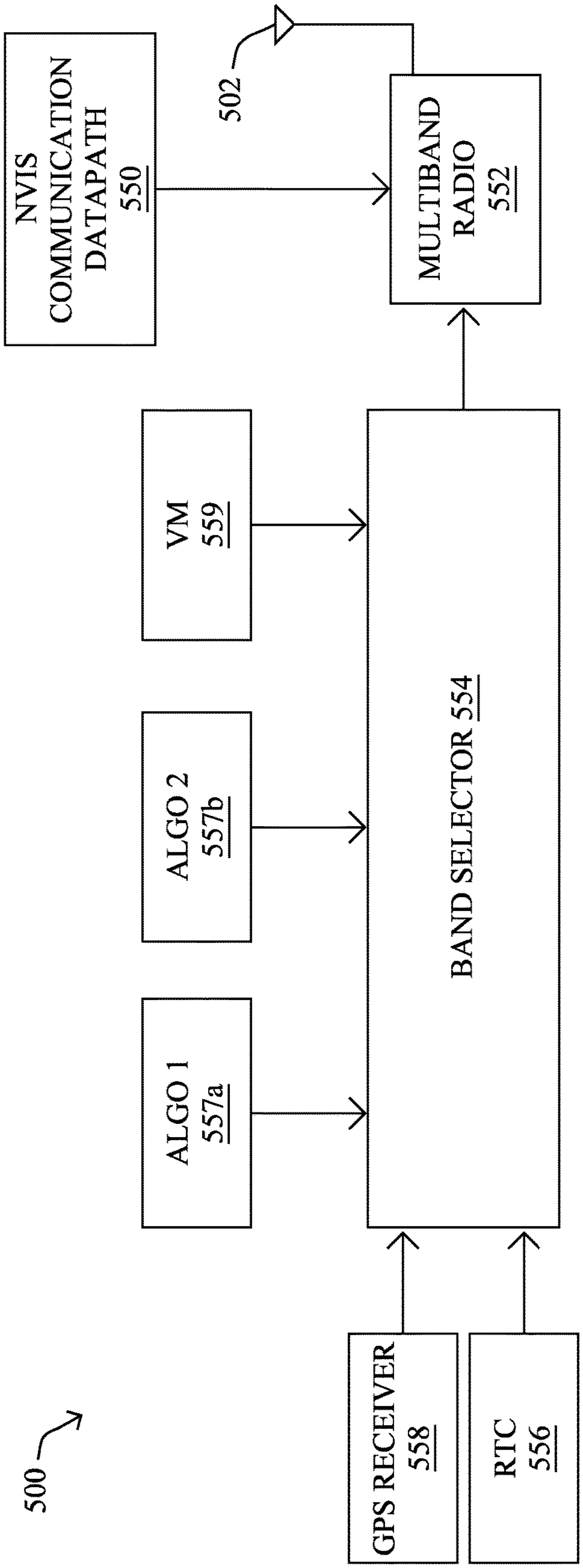
FIG. 5 illustrates an example platform to compute and automatically select an operational frequency for a skywave gateway.

FIG. 5 illustrates an example platform 500 to compute and automatically select an operational frequency for a skywave gateway. In some embodiments, the platform 500 is integrated into the skywave gateway (e.g., the skywave gateways 444 of FIGS. 4A-4B). Embodiments are not so limited, however, and in other embodiments, the platform 500 is communicatively coupled to the skywave gateway but is not directly integrated therein.

As shown in FIG. 5, the platform 500 is provided with computational capabilities and includes a global positioning satellite (GPS) receiver 558 and a real time clock (RTC) 556 that are used in conjunction to calculate the various factors (e.g., latitudes, time of day, time of year, sunspot cycles, etc.) that affect the ionosphere 108 layer and, hence the frequency to be used for NVIS communications.

During operation, the platform 500 is configured to execute various algorithms, such as Algo 1 557*a*, Algo 2 557*b*, etc. to determine a frequency to be used for NVIS communications by the NVIS network 100. Examples of the algorithms that can be automated by the platform 500 include predictions based on the parameters such as location, time and date of operation, etc., scanning algorithms that include the sending and listening to transmissions to detect signal activity, and/or ionospheric measurement using the ionosonde, among others. It is noted that, in contrast to previous approaches, the platform 500 may be configured to automatically execute such algorithms as part of a procedure to automatically (e.g., in the absence of human intervention) determine and set the frequency to be used for NVIS communications by the NVIS network 100.

In some embodiments, information from the GPS receiver 558, the RTC 556, and execution of the algorithms, Algo 1 557*a*, Algo 2 557*b*, etc. are received and/or processed by the band selector 554 to determine and set the frequency to be used for NVIS communications. It is noted that the information from the GPS receiver 558, the RTC 556, and execution of the algorithms can be processed continuously (e.g., as part of a background operation) to proactively update the frequency to be used for NVIS communications as conditions change. This process may also be performed automatically in the absence of human intervention.

As part of determining and setting the frequency to be used for NVIS communications, the platform 500 can utilize one or more machine learning techniques to improve the accuracy of frequency computations and/or to expedite convergence on a particular frequency to use for NVIS communications based on the local conditions and ionosphere 108 conditions. In addition to, or in the alternative, the platform 500 can host one or more virtual machines (VM) 559 that can be used to run third party prediction algorithms available today or developed in the future to determine and set the frequency to be used for NVIS communications by the NVIS network 100.

In some embodiments, the platform 500 can also accept user input(s) to prioritize the outcomes of the algorithms that are used by the band selector 554 for automated frequency band selection for NVIS communications. This ability adds yet another layer for automation of band selection, which is not available in current approaches that rely on manual operation.

As shown in FIG. 5, the platform 500 further includes a NVIS communications datapath 550, a multiband radio 552, and an antenna 502. The antenna 502 can be analogous to one of the antennae 102 discussed in connection with FIG. 1, herein. In some embodiments, the NVIS communications datapath 550 includes a collection of functional units such as arithmetic logic units (ALUs) or multipliers that perform data processing operations, as well as registers and buses used to facilitate transfer of the processed data within the platform 500. As will be appreciated, the multiband radio 552 can be a device (handheld or otherwise) that allows transmission and receipt of radio frequency transmissions across multiple frequency bands.

As discussed herein, the platform 500 facilitates a predictable and reliable service for sensors and communication in some of the toughest & most challenging environments that are running mission critical operations, such as military deployments, disaster relief deployments, fire-fighting deployments, mining deployments, and maritime deployments, among others.

Figure 6:
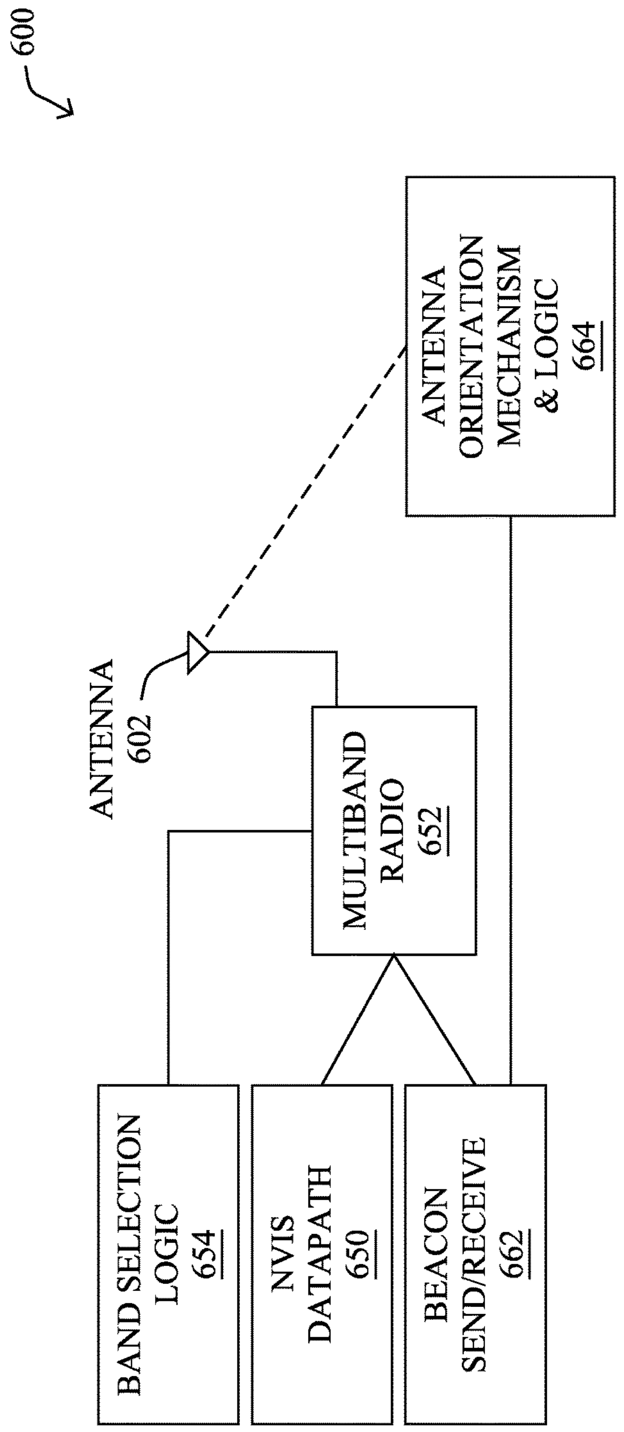
FIG. 6 illustrates an example platform to compute and automatically select an angle of transmission for a skywave gateway antenna.

FIG. 6 illustrates an example platform 600 to compute and automatically select an angle of transmission for a skywave gateway antenna 602. As shown in FIG. 6, the platform 600 includes an NVIS datapath 650, which can be analogous to the NVIS datapath 550 of FIG. 5, and a multiband radio 652, which can be analogous to the multiband radio 552 of FIG. 5, and band selection logic 654, which can be analogous to the band selector 554 of FIG. 5 and/or the antennae 102 of FIG. 1. In addition, the antenna 602 can be analogous to the antenna 502 of FIG. 5. In some embodiments, the platform 600 is integrated into the skywave gateway (e.g., the skywave gateways 444 of FIGS. 4A-4B). Embodiments are not so limited, however, and in other embodiments, the platform 600 is communicatively coupled to the skywave gateway but is not directly integrated therein.

Figure 7B:
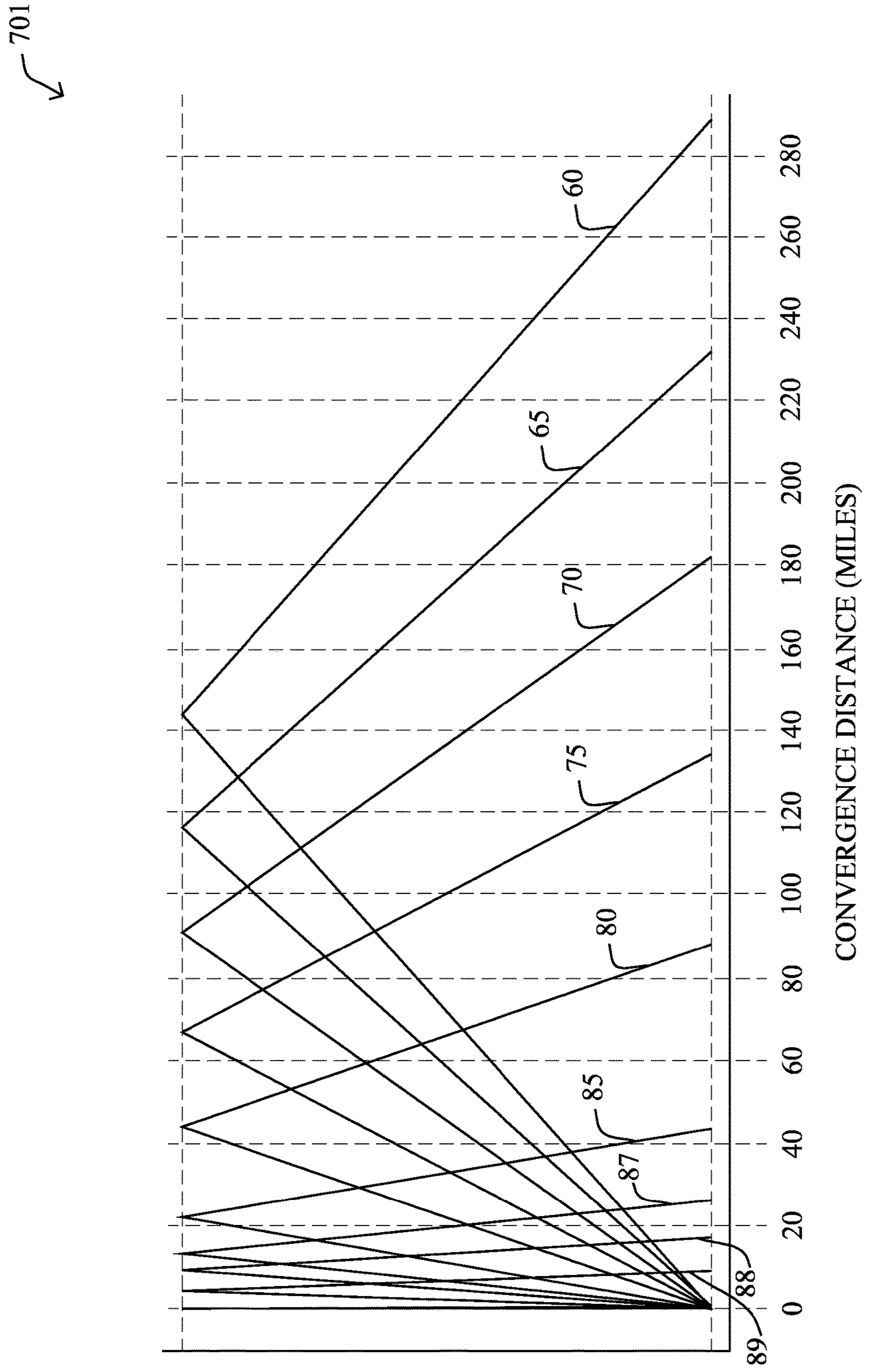
FIG. 7 (FIGS. 7A-7B) illustrates an example comparing angles of transmission for a skywave gateway antenna.

In addition to the frequency selection criteria and/or or the distance between skywave gateways described herein, NVIS communications may also be dependent on the angle of transmission. That is, the angle at which RF signals are transmitted and/or received by the antennae 102/502/602 of the skywave gateways 444 can be affected by the angle (with respect to the Earth and/or with respect to the ionosphere 108) at which the antenna 602 transmits an NVIS communication signal, as shown in FIG. 7, e.g., FIGS. 7A-7B.

As shown in FIG. 6, the platform 600 further includes a beacon send/receive component 662 and antenna organization mechanism and logic 664. In some embodiments, the beacon send/receive component 662 is configured to send out beacons using different antenna angles starting with the best prediction based on its complementary band selection logic, which is determined in accordance with the description of FIG. 5.

As discussed above, the skywave gateways 444 and, accordingly, the platforms 500/600 include various interfaces to control positioning of the antenna 602 on a mobile unit side and/or a on a base station side. Based on the received response (e.g., the strength of RF signals received, delays associated with RF signal receipt, etc.) the beacon send/receive component 662 can provide information to the platform 600 and, more particularly to the antenna organization mechanism and logic 664 to choose and provide the best antenna 602 angle (e.g., the best antenna position) for optimal NVIS communication.

As discussed above, in contrast to traditional NVIS systems (e.g., previous approaches that may generally be used for amateur HAM radio operators or other previous approaches that rely on analog signal transmission to accomplish NVIS communications), the mobile digital NVIS communication and/or IoT gateways described herein communicate with base stations, such as the skywave gateways 444, the antennae 102, and/or any other base station that is capable of sending and/or receiving transmissions in accordance with the present disclosure. For example, embodiments of the present disclosure allow for both the receiving end and the transmitting end to include capabilities to send and/or receive beacons from, for example, the beacon send/receive component 662.

Accordingly, and in further contrast to previous approaches to NVIS communication systems, the mobile digital NVIS communication and/or IoT gateways described herein include components that are capable of making decisions and/or "tweaking" various parameters associated with a wireless digital network using near vertical incidence skywave in accordance with the present disclosure automatically in the absence of human intervention. Stated alternatively, embodiments of the present disclosure allow for "both ends" of the NVIS network described herein to autonomously make decisions on transmission frequencies, antenna angles for transmission, and other factors detailed above in order to provide the benefits of the wireless digital network using near vertical incidence skywave of the present disclosure.

In addition, embodiments herein contemplate applications where the sensor side (e.g., the sensors 442 of FIGS. 4A-4B) and/or the field side endpoints (e.g., the skywave gateways 444 of FIGS. 4A-4B) will be moving and not stationary. In such embodiments, the skywave gateways 444 are able to roam over a terrain with changing landscape, such as the mountain range 104 of FIG. 1.

These scenarios can lead to changes in the optimal frequency band triggered by the automatic band selection logic 654 to suit the conditions of location and/or ionization conditions in the ionosphere 108 and may dictate changes in antenna 602 angles for optimum connectivity. As a result, one setting for a given frequency band and/or antenna position may not hold constant for a long time. However, the automatic adjustments to both the frequency band for communications and the automatic antenna angle adjustments described in connection with FIG. 5 and FIG. 6 serve to alleviate such issues.

For example, if two devices (e.g., sensors 442, devices 448, multiband radios 552, etc.) in a NVIS communication are sharing their coordinates acquired from the GPS receiver 558, the devices can compute the reflection angle given the ionosphere elevation and position, the devices can perform operations to achieve antennae orientation for optimal signal strength and quality in accordance with the disclosure.

If the device(s) have obtained knowledge of one another's orientation, physical mobility of the device may be feasible without losing the NVIS communication between the devices by utilizing the techniques described herein. Further, if the device(s) know a destination coordinate location (when engaging in physical mobility, for example), the devices(s) may orient the antenna 602 elevation and/or azimuth to an optimal direction towards the ionosphere 108 to optimize for the angle of reflection. As discussed herein, this antenna 602 orientation can occur automatically in the absence of human interaction with the device(s).

In some embodiments, the beacon send/receive component 662 periodically send beacons to assess any changes needed to track and/or reposition antennae (e.g., the antenna 602) as needed by changes in the terrain and/or changes resulting from the band selection logic 654 that cause a shift in the frequency band to be used for NVIS communications, as dictated by the changing ionospheric conditions described above. In addition, the GPS receiver 558 can be included in the platform 600 and may also operate to trigger a reassessment of the frequency band, antenna angle, or other conditions based on changes detected as the platform 600 traverses said terrain.

These and other features of the present disclosure may be especially beneficial in the mobile digital NVIS deployments described herein, particularly when operated in mission critical applications, such as military operations, first responder operations, and/or disaster management operations, which may rely on IoT sensors in remote access areas, where power resources may be limited to batteries, solar power, and/or wind power, and, therefore efficient usage of power used for communications (e.g., the NVIS communications of the present disclosure) may be very important.

The following includes various non-limiting examples for a wireless digital network using near vertical incidence skywave in accordance with the disclosure. These non-limiting examples may be used in connection with any of the embodiments discussed herein, such as the example embodiments of FIG. 3, FIGS. 4A-4B, FIG. 5, FIG. 6, and/or FIG. 8, below.

In some embodiments, a NVIS communication can be encoded. For example, a radio signal can be transmitted or received from a device (e.g., sensors 442, skywave gateways 444, devices 448, multiband radios 552, etc.) and can be encoded in an amplitude modulated radio signal. The encoding can seek to optimize the digital content of the transmitted or received signal at the carrier frequency at which the signal is transmitted or received. In some embodiments, the encoding can be a binary non-zero substitution encoding, although embodiments are not limited to any particular encoding technique.

Such signals may be converted into frames, which generally refers to an 8-bit (or other bit width) digital representation of the radio signal. The frame may also include a control sequence and a variable length body. In some embodiments, the format of the control sequence may be arbitrarily defined, however, the control sequence should contain, at minimum, the transmitter access control (MAC) followed by the destination access control (MAC) and the length of the body message.

In some embodiments, the components of the skywave WAN 450 (or the NVIS network 100 or "skywave network") may perform paring and encrypting operations as part of establishing communication with devices on the skywave WAN 450. For example, a first device can send an encoded signal containing the first device encoded media access control (MAC) address followed by another know address representing a "REQUEST TO PAIR." A second device may then receive this signal and decode the MAC address and "REQUEST TO PAIR." Continuing with this non-limiting example, the second device can then respond with another signal containing the second device encoded MAC address, followed by the first device MAC address, followed by an encoded message containing a passphrase sequence.

The first device the receives the signal and decodes the MAC addresses of the second device, as well the first device, to validate that the signal is a response signal and to validate the extract the passphrase sequence. Next, the first device can send another signal back to the second device that contains the first device encoded MAC address and second device MAC address both encrypted with a hash key constructed with the provided passphrase and a secret algorithm known to both devices.

The second device then receives the signal and decrypts the signal using the known passphrase and secret algorithm and then should decode the MAC addresses correctly. Finally, the second device responds back containing the second device encoded MAC address followed by the first device MAC address both encrypted as before followed with an optional transmission sequence number followed by a message pertaining to a message pertaining to an arbitrary message body definition for the message to follow.

In accordance with the disclosure, multiple devices can communicate point to point as previously mentioned in foregoing discussion of the pairing operations. In addition, a device may send a signal to any already paired device by sending a signal containing the encrypted encoded MAC addresses followed by the message as defined the message body definition.

Should one of the devices fail to decode a received signal, subsequent signal(s) may be transmitted that include the latest message and the message sequence number. At any time, when a device sends a signal and does not get a response back within an arbitrarily defined time window, the signal may be repeated for an arbitrary predefined quantity of tries or amount of time. In the event that no response is received during the period for which the signal is repeated, the sender device may reset all communication enter pairing search as detailed above in connection with the discussion of pairing the devices.

In some embodiments, a collection of devices may enter a spoke and hub formation where a designated hub device may control communications between the spoke devices and may set the order of communication amongst the spoke devices. For example, a hub device can issue a communication sequence involving any two (or more) devices in the spoke formation to communicate and which order. The hub device may further choose to be the repeater for all devices in the spoke. In some embodiments, any spoke device can perform concurrently as a hub device for other devices besides the designated hub device and/or any hub device can perform concurrently as a spoke device for other hub devices.

In some embodiments, each device can select an optimal frequency given its coordinates computed from its GPS receiver 558, the weather conditions, time of day, day of the year, and/or sunspot activity data (including the 11-year solar cycle) using a predefined database of Earth signal propagation and interaction with the ionosphere 108 layer. In addition, when at least two devices with shared knowledge of the location of one another (e.g., each other's coordinates), the devices may enter a duplex concurrent broadcast.

In some embodiments, a device may receive multiple signals at different frequencies. For example, a particular device may send a signal at an optimal frequency and/or may send a signal at a non-optimal frequency if dictated by a hub device or master device. That is, the initial optimal frequency for a device may be selected as discussed above but may be subsequently changed by the hub device or master device in the NVIS network.

Finally, in some embodiments, a hub device can compute and optimize the frequencies selection for multiplexing purposes by setting the optimal and non-optimal frequency selection for the spoke device(s) in the NVIS network. This may allow the hub device to maximize the communication requirements for a collection of spoke devices based on bandwidth and signal strength for a minimal quality while allowing concurrent broadcasting to the hub device and to the spoke devices.

FIGS. 7A-7B illustrate examples comparing angles of transmission for a skywave gateway antenna. For example, FIG. 7A shows a table 700 comparing the angle of transmission for a skywave gateway antenna compared to the distance a transmission from the antenna will travel and FIG. 7B shows a graph 701 comparing the angle of transmission for a skywave gateway antenna compared to the distance a transmission from the antenna will travel (e.g., the convergence distance).

Figure 8:
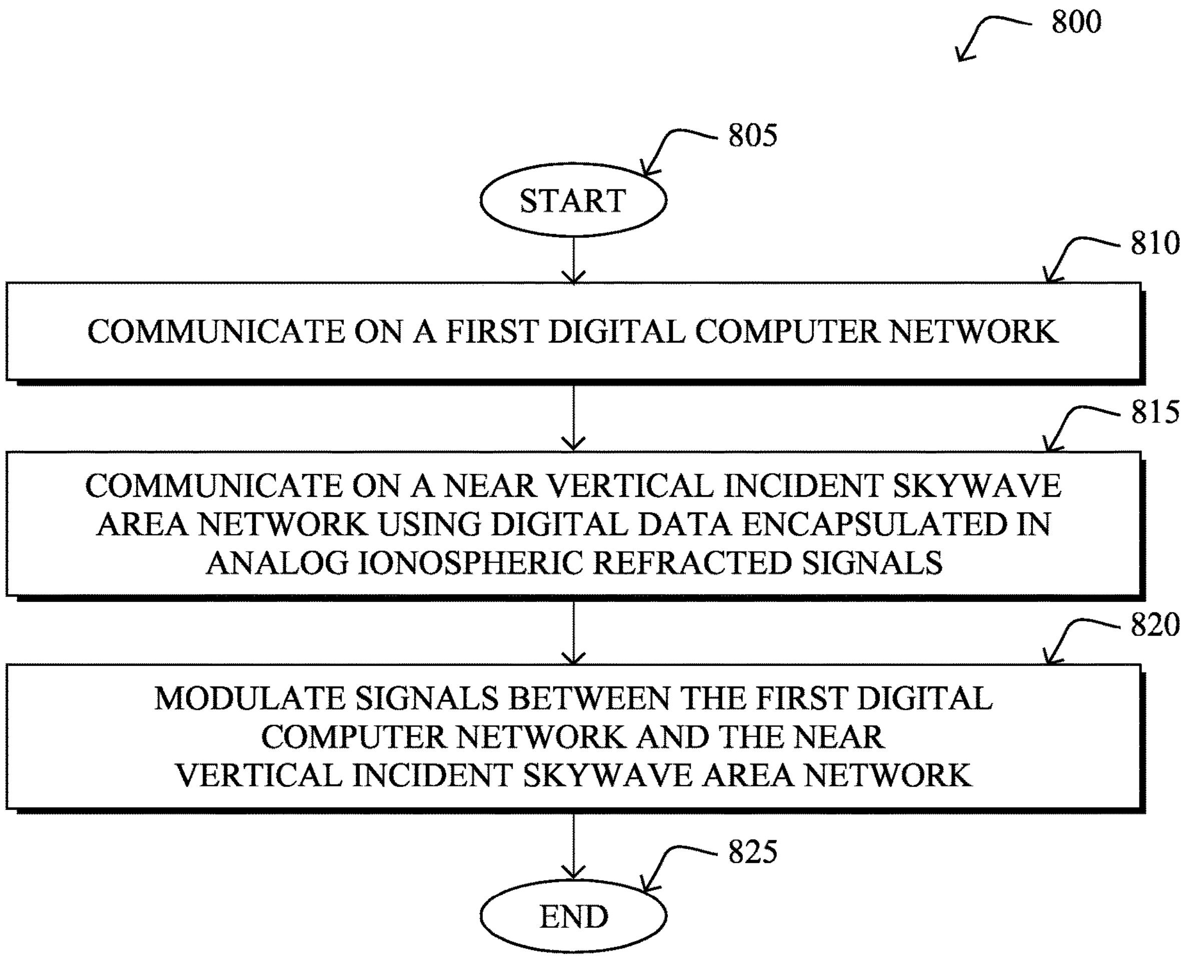
FIG. 8 illustrates an example simplified procedure for a wireless digital network using near vertical incidence skywave.

FIG. 8 illustrates an example simplified procedure for a wireless digital network using near vertical incidence skywave. For example, a non-generic, specifically configured device (e.g., device 200, skywave gateway 444, apparatus, system, etc.) may perform procedure 800 by executing stored instructions (e.g., process 248). The procedure 800 may start at step 805, and continues to step 810, where, as described in greater detail above, a gateway device (e.g., a skywave gateway 444 of FIG. 4) communicates on a first digital computer network. In various embodiments, the gateway device can be one of either a stationary base station or a mobile gateway.

At step 815, as detailed above, the gateway device communicates on a near vertical incident skywave area network using digital data encapsulated in analog ionospheric refracted signals. As discussed above, the procedure 800 can include encrypting communications on the near vertical incident skywave area network.

In various embodiments, communicating on the near vertical incident skywave area network can include operating in accordance with media access control layer functionality. Embodiments are not so limited, however, and in some embodiments, communicating on the near vertical incident skywave area network can include communicate with a remote gateway device. In such embodiments, the remote gateway device can also be configured to communicate on a remote digital computer network and to modulate between the near vertical incident skywave area network and the remote digital computer network.

At step 820, as detailed above, the gateway device modulates signals between the first digital computer network and the near vertical incident skywave area network based on dynamic channel selection and multi-domain multiplexing. In some embodiments, modulating signals on the near vertical incident skywave area network can include multiplexing with combination of two or more of time divisions, frequency divisions, space divisions, wavelength divisions, and/or code divisions.

In various embodiments, the first digital computer network can be an ethernet network, an internet network, a wireless network, a short-range wireless network, an amplitude modulated and/or frequency modulated radio frequency network, a serial communication network, a supervisory control and data acquisition network, a request-response controller-based network, and/or a controller area network.

As discussed above, the procedure 800 can include handshaking on the near vertical incident skywave area network for channel selection and scheduling. In addition, the dynamic channel selection can be based on sun position, global positioning of the gateway device, and/or local weather. Further, the dynamic channel selection can include using machine learning for predictive channel selection. Moreover, in some embodiments, the dynamic channel selection can be based on determining a critical frequency and/or a minimum frequency and selecting a specific frequency between the critical frequency and the minimum frequency.

In some embodiments, the procedure 800 can further include adjusting an antenna angle of an antenna for the near vertical incident skywave area network based on one or more communication factors. In such embodiments, the one or more communication factors can be selected from a group consisting of a location of the gateway device, a frequency band used, and/or a location of a remote device to which communication is intended. Embodiments are not so limited, however, and in some embodiments, the one or more communication factors can be selected from a group consisting of a strength of a received radio frequency signal and/or signal delays, among other factors described herein.

As discussed above, in various embodiments, the procedure 800 can include compressing data to be sent on the near vertical incident skywave area network and decompressing data received on the near vertical incident skywave area network. In such embodiments, the procedure 800 can further include compressing and decompressing based on using qualitative and quantitative compression.

Procedure 800 then ends at step 825.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedure 800 is described separately from other embodiments above, certain steps from each procedure may be incorporated into each other procedure, and the procedures are not meant to be mutually exclusive.

The techniques described herein, therefore, allow for deployment of a digital wireless NVIS gateway and NVIS WAN. In addition, the techniques herein provide for automated frequency modulation and/or automated antenna angle control in complex NVIS deployments, particularly in complicated geophysical topologies, dangerous situations, and situations that involve mission critical applications.

While there have been shown and described illustrative embodiments that provide for a wireless digital network using near vertical incidence skywave, it is to be understood that various other adaptations and modifications may be made within the spirit and scope of the embodiments herein. For example, while certain embodiments are described herein with respect to using certain techniques for a wireless digital network using near vertical incidence skywave, these techniques are not limited as such and may be used for other functions, in other embodiments. In addition, while certain protocols are shown, NVIS communication protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having computer-executable program instructions stored thereon that execute on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

communicating, by a gateway device, on a first digital computer network;

communicating, by the gateway device, on a near vertical incident skywave area network using ionospheric refracted signals, wherein the ionospheric refracted signals encode digital content of signals transmitted or received from the gateway device;

determining, by the gateway device and based at least in part on a natural condition associated with a location of the gateway device, a channel for transmitting or receiving the signals;

modulating, by the gateway device, the signals based on the channel and multi-domain multiplexing; and adjusting an antenna angle of an antenna for the near vertical incident skywave area network based on one or more communication factors, wherein the one or more communication factors include a received radio frequency signal.

2. The method as in claim 1, wherein the one or more communication factors include at least one of:

the location of the gateway device;

a frequency band used; or a second location of a remote device to which communication is intended.

3. The method as in claim 1, wherein the one or more communication factors further include:

signal delays.

4. The method as in claim 1, wherein the gateway device is one of either a stationary base station or a mobile gateway.

5. The method as in claim 1, wherein communicating on the near vertical incident skywave area network comprises operating in accordance with media access control layer functionality.

6. The method as in claim 1, wherein communicating on the near vertical incident skywave area network is to communicate with a remote gateway device.

7. The method as in claim 6, wherein the remote gateway device is also configured to communicate on a remote digital computer network and to modulate between the near vertical incident skywave area network and the remote digital computer network.

8. The method as in claim 1, wherein the first digital computer network is selected from a group consisting of:

an ethernet network;

an internet network;

a wireless network;

a short-range wireless network;

amplitude modulated and or frequency modulated radio frequency network;

a serial communication network;

a supervisory control and data acquisition network;

a request-response controller-based network; and a controller area network.

9. The method as in claim 1, further comprising:

compressing first data to be sent on the near vertical incident skywave area network; and decompressing second data received on the near vertical incident skywave area network.

10. The method as in claim 9, wherein compressing and decompressing are based on using qualitative and quantitative compression.

11. The method as in claim 1, wherein modulating the signals on the near vertical incident skywave area network comprises multiplexing with combination of two or more of:

time divisions, frequency divisions, space divisions, wavelength divisions, and code divisions.

12. The method as in claim 1, further comprising:

handshaking on the near vertical incident skywave area network for channel selection and scheduling.

13. The method as in claim 1, wherein the natural condition associated with the location of the gateway device includes at least one of sun position at the location, global positioning data of the gateway device, or weather condition at the location.

14. The method as in claim 1, further comprising:

predicting, using machine learning and based at least on the natural condition associated with the location of the gateway device, the channel.

15. The method as in claim 13, further comprising:

determining a critical frequency and a minimum frequency; and selecting a specific frequency between the critical frequency and the minimum frequency.

16. The method as in claim 1, further comprising:

encrypting communications on the near vertical incident skywave area network.

17. An apparatus, comprising:

a first network interface to communicate on a first digital computer network;

a second network interface to communicate on a near vertical incident skywave area network using ionospheric refracted signals, wherein the ionospheric refracted signals encode digital content of signals transmitted or received from the apparatus;

a processor coupled to the first network interface and the second network interface and configured to execute one or more processes; and a memory configured to store a process that is executable by the processor, the process, when executed, configured to:

determine, based at least in part on a natural condition associated with a location of the apparatus, a channel for transmitting or receiving the signals, and modulate the signals based on the channel and multi-domain multiplexing, and adjust an antenna angle of an antenna for the near vertical incident skywave area network based on one or more communication factors, wherein the one or more communication factors include a received radio frequency signal.

18. The apparatus as in claim 17, wherein the process, when executed, is further configured to:

adjust an antenna angle of an antenna for the near vertical incident skywave area network based on one or more communication factors.

19. A tangible, non-transitory, computer-readable medium having computer-executable instructions stored thereon that, when executed by a processor on a gateway device, cause the gateway device to perform a method comprising:

communicating on a first digital computer network;

communicating on a near vertical incident skywave area network using ionospheric refracted signals, wherein the ionospheric refracted signals encode digital content of signals transmitted or received from the gateway device;

determining, based at least in part on a natural condition associated with a location of the gateway device, a channel for transmitting or receiving the signals;

modulating the signals based on the channel and multi-domain multiplexing; and adjusting an antenna angle of an antenna for the near vertical incident skywave area network based on one or more communication factors, wherein the one or more communication factors include a received radio frequency signal.

20. The method of claim 1, further comprising:

obtaining, by the gateway device, a second location of a second gateway device that communicates with the gateway device on the near vertical incident skywave area network using the ionospheric refracted signals; and based on the second location of the second gateway device, automatically adjusting, by the gateway device, at least one of:

the channel for communicating with the second gateway device, and the antenna angle of the antenna.

* * * * *